United States Patent
Nakagawa et al.

(10) Patent No.: US 10,944,910 B2
(45) Date of Patent: Mar. 9, 2021

(54) DISPLAY APPARATUS, CONTROL METHOD THEREOF, AND NON-TRANSITORY COMPUTER READABLE MEDIUM

(71) Applicant: CANON KABUSHIKI KAISHA, Tokyo (JP)

(72) Inventors: Ryo Nakagawa, Kawasaki (JP); Hirofumi Urabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 16/354,913

(22) Filed: Mar. 15, 2019

(65) Prior Publication Data

US 2019/0289217 A1    Sep. 19, 2019

(30) Foreign Application Priority Data

Mar. 16, 2018  (JP) .............................. JP2018-049555

(51) Int. Cl.
*H04N 5/232*     (2006.01)
*H04N 5/57*      (2006.01)
*H04N 5/243*     (2006.01)

(52) U.S. Cl.
CPC ..... *H04N 5/23293* (2013.01); *H04N 5/23222* (2013.01); *H04N 5/243* (2013.01); *H04N 5/57* (2013.01)

(58) Field of Classification Search
None
See application file for complete search history.

(56) References Cited

U.S. PATENT DOCUMENTS

| | | | |
|---|---|---|---|
| 2008/0158392 A1* | 7/2008 | Nikata | H04N 5/44504 348/234 |
| 2015/0009249 A1* | 1/2015 | Kudo | H04N 5/66 345/691 |
| 2017/0272686 A1* | 9/2017 | Fukushima | G09G 5/10 |
| 2017/0310921 A1 | 10/2017 | Koike | |
| 2018/0308434 A1* | 10/2018 | Nakanishi | G09G 3/36 |

FOREIGN PATENT DOCUMENTS

| | | | |
|---|---|---|---|
| JP | 2005191985 A | * | 7/2005 |
| JP | 2005-321424 A | | 11/2005 |
| JP | 2007-140483 A | | 6/2007 |
| JP | 2008-299191 A | | 12/2008 |
| JP | 2017-167402 A | | 9/2017 |

\* cited by examiner

*Primary Examiner* — Quan Pham
(74) *Attorney, Agent, or Firm* — Cowan, Liebowitz & Latman, P.C.

(57) ABSTRACT

A display apparatus configured to display an input image and a graphics image on a display unit, wherein the graphics image is displayed together with the input image, the display apparatus includes: at least one processor that operates as: obtaining unit configured to receive a setting value relating to display luminance of the display apparatus; detection unit configured to detect a characteristic value of the input image; and control unit configured to display the graphics image on the display unit with a luminance gradation based on the setting value and the characteristic value.

14 Claims, 13 Drawing Sheets

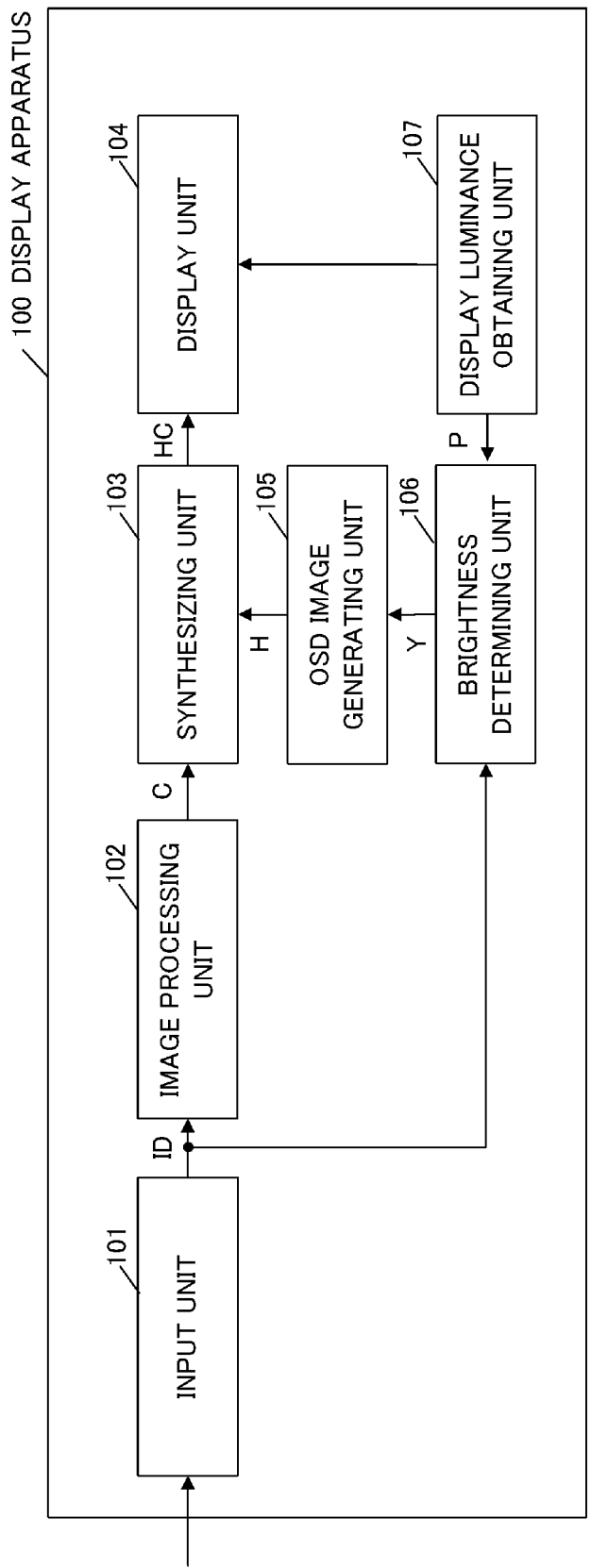

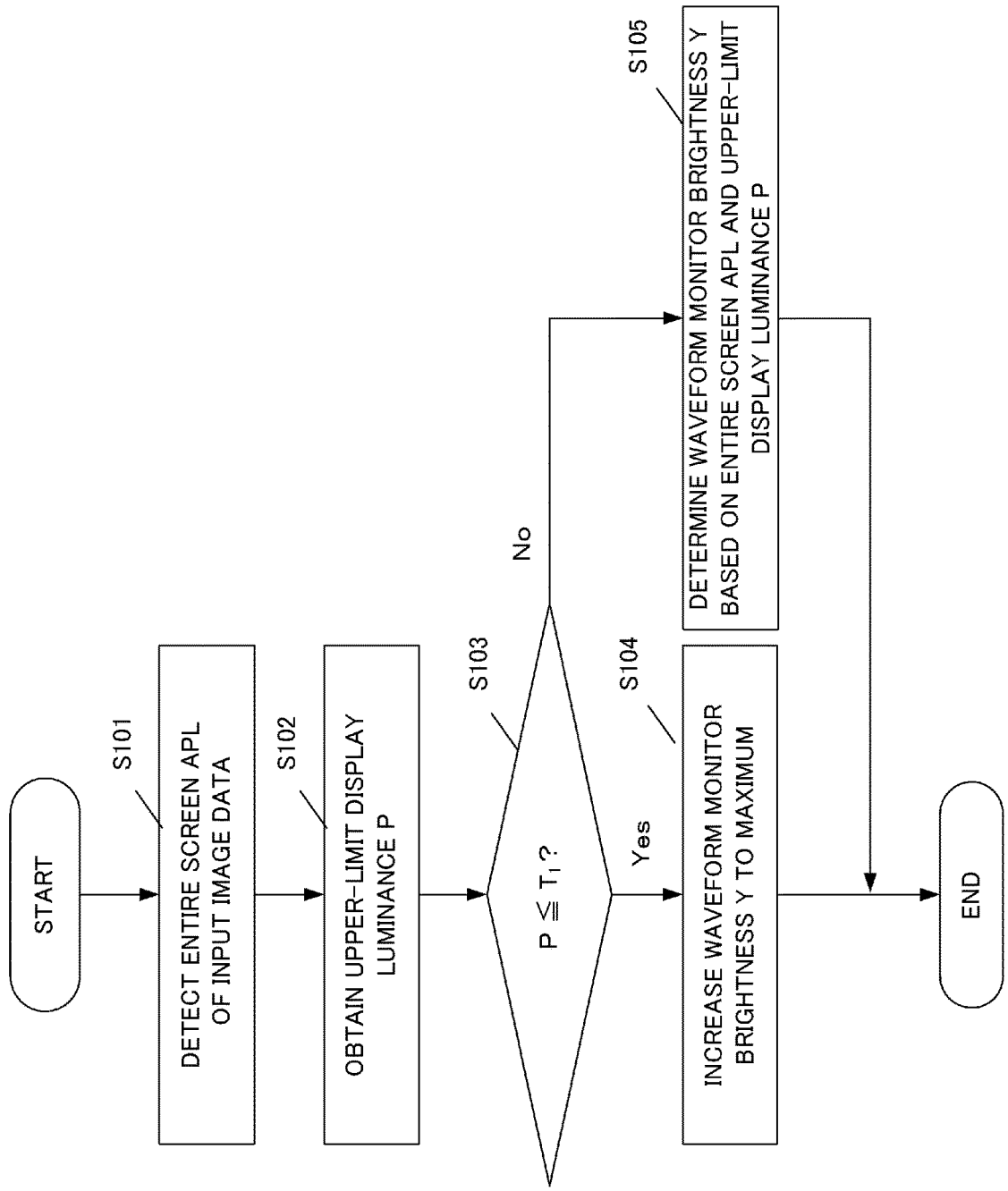

FIG.3A

WAVEFORM MONITOR BRIGHTNESS Y (%)

100

25

0      110      APL      255

FIG.3B

WAVEFORM MONITOR BRIGHTNESS Y (%)

100

10

0      111      APL      255

ND NON-TRANSITORY
DISPLAY APPARATUS, CONTROL METHOD THEREOF, AND NON-TRANSITORY COMPUTER READABLE MEDIUM

BACKGROUND OF THE INVENTION

Field of the Invention

The present invention relates to a display apparatus, a control method thereof, and a non-transitory computer readable medium.

Description of the Related Art

In recent years, high dynamic range (HDR) image data having a wide dynamic range are often handled. In HDR image data standards, colors and gradation are reproduced with the use of perceptual quantizer (PQ) curves, for example. The PQ curves are defined by a wide luminance range of at most 10,000 $cd/m^2$, and the luminance of display apparatuses has been increased to achieve HDR image display.

Further, some display apparatuses have an on-screen display (OSD) function that allows the display apparatuses to perform waveform monitor (graphics image) display. The waveform monitor is a function for displaying luminance signals and color signals of image signals as waveforms, and with the waveform monitor, a user can relatively easily check whether overexposure or underexposure are present in images, for example. In a case where the waveform monitor is superimposed on an image signal to be displayed, the user feels uncomfortable when the apparent brightness of the waveform monitor greatly differs from a display image. Specifically, the waveform monitor that is much brighter than the display image gives glare to the user, and the waveform monitor that is much darker than the display image is difficult to see due to a difference in luminance.

Japanese Patent Application Publication No. 2005-321424 discloses a method for controlling the apparent brightness of OSD to be a certain value. Specifically, there is disclosed a technology for preventing, when the OSD is being displayed, control of changing the emission luminance of a backlight on the basis of the average picture level (APL) of an input image, to thereby control the apparent brightness of the OSD to be a certain value.

However, Japanese Patent Application Publication No. 2005-321424 cannot improve the image qualities of input images when the OSD is being displayed because when the OSD is being displayed, the control of changing the emission luminance of the backlight is not performed.

SUMMARY OF THE INVENTION

In view of the foregoing, the present invention has an object to provide a technology for improving the image qualities of input images and appropriately controlling the brightness of graphics images that are superimposed on the input images.

The present invention in its first aspect provides a display apparatus configured to display an input image and a graphics image on a display unit, wherein the graphics image is displayed together with the input image, the display apparatus comprising: at least one processor that operates as:

obtaining unit configured to receive a setting value relating to display luminance of the display apparatus;

detection unit configured to detect a characteristic value of the input image; and control unit configured to display the graphics image on the display unit with a luminance gradation based on the setting value and the characteristic value.

The present invention in its second aspect provides a display apparatus configured to display a high dynamic range (HDR) image on a display unit, the display apparatus comprising:

at least one processor that operates as:

first obtaining unit configured to obtain a characteristic value relating to luminance of the HDR image;

second obtaining unit configured to obtain a setting value relating to maximum display luminance of the display apparatus; and control unit configured to control the display unit so that the display unit displays a graphics image relating to the HDR image together with the HDR image, wherein the control unit is further configured to control the display unit so that in a case where the setting value is a certain value, a first display luminance of a first graphics image relating to a first HDR image having a first value as the characteristic value is higher than a second display luminance of a second graphics image relating to a second HDR image having a second value as the characteristic value, wherein the second value is smaller than the first value.

The present invention in its third aspect provides a control method of a display apparatus configured to display an input image and a graphics image on a display unit, wherein the graphics image is displayed together with the input image, control method comprising:

receiving a setting value relating to display luminance of the display apparatus;

detecting a characteristic value of the input image; and displaying the graphics image on the display unit with a luminance gradation based on the setting value and the characteristic value.

The present invention in its fourth aspect provides a control method of a display apparatus configured to display a high dynamic range (HDR) image on a display unit, the control method comprising:

obtaining a characteristic value relating to luminance of the HDR image;

obtaining a setting value relating to maximum display luminance of the display apparatus; and controlling the display unit so that the display unit displays a graphics image relating to the HDR image together with the HDR image, controlling the display unit so that in a case where the setting value is a certain value, a first display luminance of a first graphics image relating to a first HDR image having a first value as the characteristic value is higher than a second display luminance of a second graphics image relating to a second HDR image having a second value as the characteristic value, wherein the second value is smaller than the first value.

According to the present invention, it is possible to provide the technology for improving the image qualities of the input images and appropriately controlling the brightness of the graphics images that are superimposed on the input images.

Further features of the present invention will become apparent from the following description of exemplary embodiments with reference to the attached drawings.

BRIEF DESCRIPTION OF THE DRAWINGS

FIG. 1 is a functional block diagram illustrating an example of a display apparatus according to a first embodiment;

FIG. 2 is a flowchart illustrating an example of processing according to the first embodiment;

FIG. 3A and FIG. 3B are diagrams each illustrating a relationship between an APL and the brightness of a waveform monitor according to the first embodiment;

DESCRIPTION OF THE EMBODIMENTS

Figure 4:
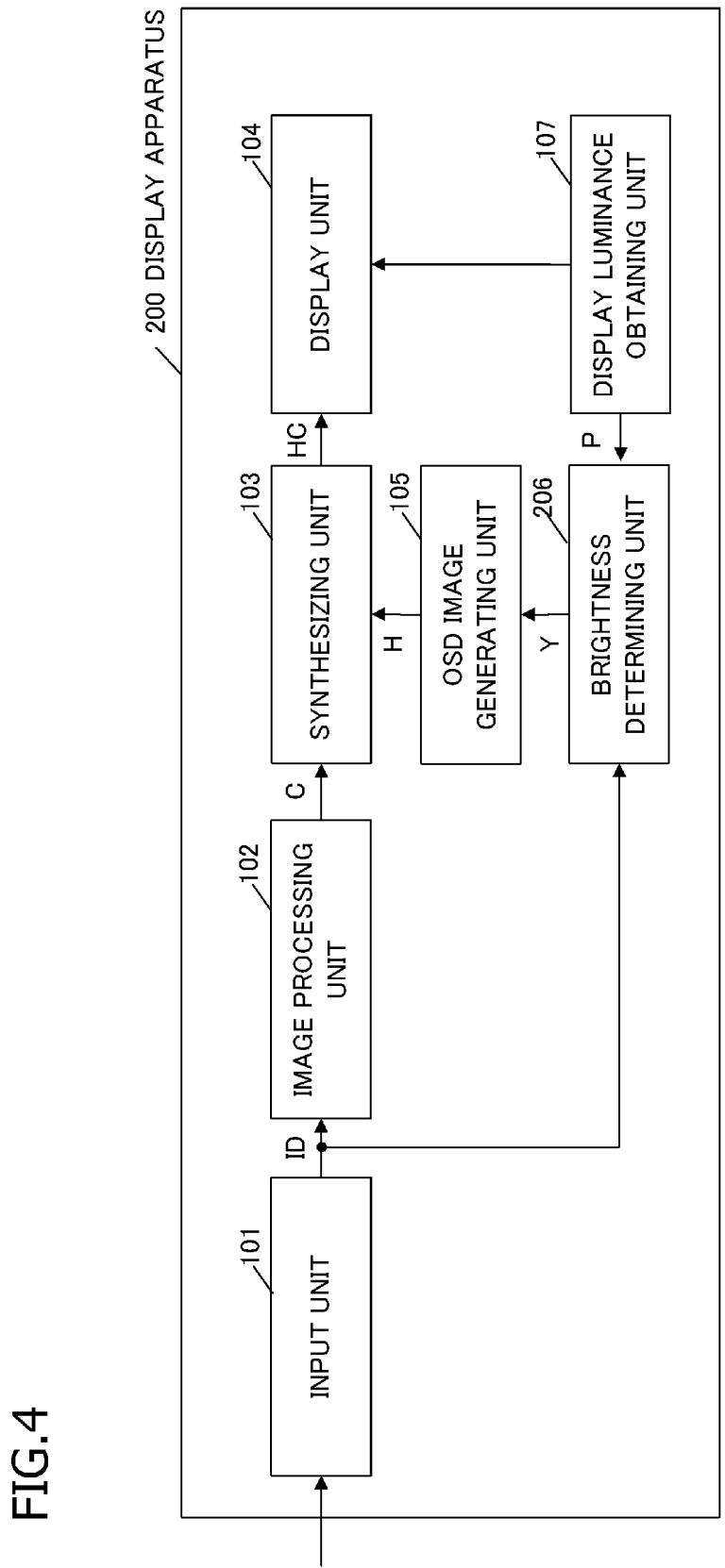
FIG. 4 is a functional block diagram illustrating an example of a display apparatus according to a second embodiment.

Now, embodiments of the present invention are described with reference to the drawings. The technical scope of the present invention is defined by the scope of claims, and is not limited to the embodiments exemplified below. Further, all the combinations of features described in the embodiments are not necessarily required for the present invention. The contents described in the present specification and the drawings are exemplary and are not intended to be regarded as limiting the present invention. Various modifications (including organic combinations of the embodiments) can be made on the basis of the gist of the present invention, and such modifications are not excluded from the scope of the present invention. In short, the configurations of combinations of the embodiments and the modifications thereof are all included in the present invention.

A display apparatus according to each embodiment of the present invention includes a display panel, and a backlight configured to illuminate the display panel from the back surface of the display panel. In the following, there is described a case where a liquid crystal panel is used as the display panel, and an LED light-emitting element is used as the light source of the backlight, but the display panel and the light source of the backlight are not limited thereto. For example, the light source of the backlight may be an organic EL element or a laser light source. The display panel may be a display panel including elements other than liquid crystal elements (elements capable of controlling the transmittance of light from the backlight). Further, the display apparatus is also applicable to, for example, a liquid crystal projector configured to project images on a screen. A self-emitting display apparatus such as an organic electro luminescence (EL) display apparatus or a plasma display apparatus may be used.

First Embodiment

Now, a first embodiment of the present invention is described.

In the present embodiment, there is described an example in which the brightness of a waveform monitor (graphics image) is controlled on the basis of the setting value of display luminance that is set by a user and the characteristic value of an input image. In the present embodiment, the brightness of the waveform monitor represents the luminance gradation of the waveform monitor of the display apparatus. A display unit (for example, liquid crystal panel) of the display apparatus controls the transmittance of a liquid crystal element based on the luminance gradation. Then, from the emission luminance of the backlight and the above-mentioned transmittance, the display luminance of the display apparatus is determined. Further, the brightness corresponds to the pixel gradation value of the waveform monitor. When the input image signal is an 8-bit signal, for example, the maximum value of the brightness of the waveform monitor corresponds to a pixel gradation value of 255. Further, in the present embodiment, the display apparatus can be set to display luminance of at most $1,000 \text{ cd/m}^2$. Now, the overall configuration, processing contents, and brightness determining processing of the display apparatus according to the present embodiment are described in order.

<Overall Configuration>

FIG. 1 is a functional block diagram illustrating an example of a display apparatus 100 according to the present embodiment. The display apparatus 100 is an information processing apparatus (computer) including an arithmetic and logic unit (processor), a memory, a storage device, an input/output device, and other components. The display apparatus 100 executes programs stored in the storage device, thereby providing the functions of, for example, an input unit 101, an image processing unit 102, a synthesizing unit 103, an OSD image generating unit 105, a brightness determining unit 106, and a display luminance obtaining unit 107 of the display apparatus 100. A part or all of these functions may be implemented by dedicated logic circuits such as ASICs or FPGAs.

The input unit 101 is a functional unit configured to convert input image data (input image) that is input to the display apparatus 100 into image data (image signal) in a format that can be processed inside the display apparatus 100. Further, the input unit 101 outputs an input image signal ID obtained through the conversion to the image processing unit 102 and the brightness determining unit 106. The input unit 101 includes a reception portion (not shown) that is an SDI input terminal complying with the SDI standard, for example. In the description of the present embodiment, the image signal is a signal having a bit depth of 8 bits.

The image processing unit 102 performs gradation correction on the input image signal ID that is output from the input unit 101. In the gradation correction, for example, a one-dimensional look-up table (1D-LUT) is used. Further, the image processing unit 102 outputs, to the synthesizing unit 103, an image signal C obtained through image processing.

The display luminance obtaining unit 107 is a functional unit configured to receive the setting value (upper-limit display luminance P) of the upper limit (maximum display luminance) of the display luminance from the user. The display luminance obtaining unit 107 outputs the upper-limit display luminance P of the backlight to the display unit 104, thereby adjusting the display luminance. The display luminance obtaining unit 107 outputs the upper-limit display luminance P also to the brightness determining unit 106. Further, the display luminance is set to a value of from 0 to 1,000 cd/m² in the present embodiment, but may be set to a higher value. Further, the display luminance obtaining unit 107 stores the upper-limit display luminance P, which is set by the user, to a non-volatile memory (not shown). In the present embodiment, the display apparatus 100 receives the setting value of the upper limit value of the display luminance from the user, but the setting value is not particularly limited. For example, the display apparatus 100 may receive the setting value of the emission luminance of the backlight.

The brightness determining unit 106 is a functional unit configured to determine waveform monitor brightness Y on the basis of an average picture level (APL) that is the characteristic value of the input image signal ID, which is output from the input unit 101, and the above-mentioned upper-limit display luminance P. The APL is, for example, the average luminance level of frame images of an input image signal that is a moving image signal. Specifically, the brightness determining unit 106 obtains the upper-limit display luminance P, which is set by the user, from the display luminance obtaining unit 107. Then, the brightness determining unit 106 determines the waveform monitor brightness Y on the basis of the APL and the upper-limit display luminance P described above. The method of determining the waveform monitor brightness Y is described later. The brightness determining unit 106 outputs the waveform monitor brightness Y and the input image signal ID to the OSD image generating unit 105. The brightness determining unit 106 may determine the pixel gradation value (0 to 255 in the case of 8 bits) of the waveform monitor by the method described above.

The OSD image generating unit 105 is a functional unit configured to generate a waveform monitor image signal H on the basis of the waveform monitor brightness Y and the input image signal ID. The waveform monitor brightness Y is output from the brightness determining unit 106. Further, the OSD image generating unit 105 outputs the generated waveform monitor image signal H to the synthesizing unit 103.

In the present embodiment, the waveform monitor is a graphics image representing the distribution map of the pixel gradation values in the input image signal. Specifically, the horizontal axis of the waveform monitor corresponds to the horizontal axis of the input image signal and the vertical axis of the waveform monitor takes the pixel gradation value. The pixel gradation value of each pixel in the input image signal is plotted on the vertical axis of the waveform monitor to be displayed. With this, the distribution map of the pixel gradation values in the input image signal can be grasped, and hence whether overexposure or underexposure are present can be relatively easily checked. Further, the waveform monitor of the present embodiment is an image in which points (for example, white points) representing the above-mentioned pixel gradation values are plotted on a base (for example, black image) to be displayed. In the following, the waveform monitor brightness Y represents the brightness of the points representing the pixel gradation values described above.

The synthesizing unit 103 is a functional unit configured to synthesize the input image signal ID that is output from the image processing unit 102 and the waveform monitor image signal H that is output from the OSD image generating unit 105. Specifically, the synthesizing unit 103 performs synthesis by superimposing the waveform monitor image signal H on the input image signal ID to generate a synthesized image HC, and outputs the synthesized image HC to the display unit 104.

The display unit 104 includes the backlight and the liquid crystal panel, and is a functional unit configured to display the synthesized image HC that is output from the synthesizing unit 103. Further, the display luminance of the display unit 104 is controlled on the basis of the upper-limit display luminance P that is obtained by the display luminance obtaining unit 107. The upper-limit display luminance P is described later. The display apparatus according to the present embodiment can use, as the display unit, a display element (MEMS shutter, for example) other than the liquid crystal panel.

<Processing Contents>

Next, the basic operation of the brightness determining unit 106 in the present embodiment is described with reference to FIG. 2. FIG. 2 is a flowchart illustrating the processing of determining the waveform monitor brightness Y (pixel gradation value) according to the present embodiment.

The brightness determining unit 106 detects the APL (entire screen APL) of all the regions of the input image signal ID that is output from the input unit 101 (S101). Then, the brightness determining unit 106 obtains the upper-limit display luminance P that is output from the display luminance obtaining unit 107 (S102), and determines whether or not the upper-limit display luminance P is a threshold $T_1$ or smaller (S103). The entire screen APL is, for example, the average luminance level of all the regions of each frame image of an input image signal that is a moving image signal. The entire screen APL may, however, be the average luminance level of effective image regions of each frame image of the input image signal.

Here, the threshold $T_1$ is set to a value so that when the upper-limit display luminance P is the threshold $T_1$ or smaller, the visibility of the waveform monitor drops through a reduction in brightness of the waveform monitor. The threshold $T_1$ of the display luminance in the present embodiment is 100 cd/m², but is not particularly limited. Further, the threshold $T_1$ may be variable.

When the upper-limit display luminance P is the threshold $T_1$ or smaller (S103—Yes), the brightness determining unit 106 increases the waveform monitor brightness Y to maximum (S104). When the upper-limit display luminance P is larger than the threshold $T_1$ (S103—No), the brightness determining unit 106 determines the waveform monitor brightness Y on the basis of the entire screen APL and the upper-limit display luminance P (S105), and outputs the resultant to the OSD image generating unit 105. The details of the processing of determining the brightness Y in Step S105 are described below.

<<Brightness Determining Processing (Step S105)>>

The processing in Step S105 in the present embodiment, that is, the processing that the brightness determining unit 106 performs to determine the waveform monitor brightness Y is described.

In the present embodiment, the brightness determining unit 106 determines a lower limit value A of the waveform monitor brightness Y by using the threshold $T_1$ and the upper-limit display luminance P (Expression 1).

$$A = \frac{T_1}{P} \times 100 \qquad (1)$$

Further, the brightness determining unit 106 obtains a ratio B between an $APL_{max}$ that is the maximum value of a value that the APL may take (a value that the input image signal ID may take) and the APL (Expression 2). Here, when the number of bits of the image signal is eight, the $APL_{max}$ is 255.

$$B = \frac{APL}{APL_{max}} \qquad (2)$$

Then, the brightness determining unit 106 determines the waveform monitor brightness Y by using the above-mentioned values A and B (Expression 3).

$$Y = A + (100 - A) \times B \qquad (3)$$

(When Upper-Limit Display Luminance P is 400 cd/m²)

When the $APL_{max}$ is 255 and the upper-limit display luminance P is 400 cd/m², for example, the waveform monitor brightness Y is expressed by Expression (4) below.

$$Y = 25 + 75 \times \frac{APL}{APL_{max}} \qquad (4)$$

FIG. 3A is a diagram illustrating the relationship between the APL and the waveform monitor brightness Y, which is expressed by Expression (4). As indicated by a solid line 110 in FIG. 3A, as the APL becomes lower, the waveform monitor brightness Y becomes lower, and when the APL is 255, the waveform monitor brightness Y is maximum (100%). The waveform monitor brightness Y of 100% corresponds to a display luminance of 400 cd/m², for example. As described above, the waveform monitor brightness Y is reduced more as the APL becomes lower when the upper-limit display luminance P is a certain value so that glare that is given when the waveform monitor is displayed while a dark image is being displayed is reduced. In addition, the waveform monitor is displayed more brightly as the APL becomes higher when the upper-limit display luminance P is a certain value so that the input image and the waveform monitor are prevented from being largely different from each other in brightness, and hence the user can see the waveform monitor without difficulty.

(When Upper-Limit Display Luminance P is 1,000 cd/m²)

Further, in a similar manner, when the upper-limit display luminance P is 1,000 cd/m², the waveform monitor brightness Y is expressed by Expression (5) below.

$$Y = 10 + 90 \times \frac{APL}{APL_{max}} \qquad (5)$$

FIG. 3B is a diagram illustrating the relationship between the APL and the waveform monitor brightness Y, which is expressed by Expression (5). As indicated by a solid line 111 in FIG. 3B, when the upper-limit display luminance P is 1,000 cd/m², as compared to the case where the upper-limit display luminance P is 400 cd/m², the reduction amount of the display luminance based on the APL is large. For example, when the APL is zero and the upper-limit display luminance P is 400 cd/m², the waveform monitor brightness Y is 25(%) with the threshold $T_1$ (100 cd/m²). When the APL is zero and the upper-limit display luminance P is 1,000 cd/m², on the other hand, the waveform monitor brightness Y is 10(%) with the threshold $T_1$ (100 cd/m²). As described above, the reduction amount of the display luminance based on the APL is increased as the upper-limit display luminance P becomes higher so that glare that is given when the waveform monitor is displayed while a dark image is being displayed with the luminance set to high is reduced.

<Advantageous Effect of Present Embodiment>

As described above, the display apparatus according to the present embodiment reduces the liquid crystal brightness of the waveform monitor more as the APL becomes lower when the upper-limit display luminance P is high. In addition, the display apparatus according to the present embodiment increases the reduction amount of the brightness of the waveform monitor as the upper-limit display luminance P becomes higher, thereby being capable of reducing glare that is given when the waveform monitor is displayed while a dark image is being displayed with the luminance set to high.

Second Embodiment

Now, a second embodiment of the present invention is described.

In the first embodiment described above, there is described the example in which the waveform monitor brightness Y is determined on the basis of the entire screen APL and the upper-limit display luminance P. However, when the APL of the entire screen (hereinafter referred to as "entire screen APL") is high but the APL of a partial region including a region on which the waveform monitor is superimposed (hereinafter referred to as "partial region APL") is low, the user may feel glare because the brightness of the waveform monitor is much higher than the brightness of the region in which the waveform monitor is displayed.

In view of this, in the present embodiment, there is described an example in which the waveform monitor brightness Y is determined on the basis of the entire screen APL, the upper-limit display luminance P, and the partial region APL. Now, configurations and processing different from those in the first embodiment are described in detail. Configurations and processing similar to those in the first embodiment are denoted by the same reference symbols and description thereof is omitted. The entire screen APL is, for example, the average luminance level of all the regions of each frame image of an input image signal that is a moving image signal. The entire screen APL may, however, be the average luminance level of effective image regions of each frame image of the input image signal.

<Overall Configuration>

FIG. 4 is a functional block diagram illustrating an example of a display apparatus 200 according to the present embodiment. The display apparatus 200 includes a brightness determining unit 206 instead of the brightness determining unit 106 of the first embodiment.

The brightness determining unit 206 is a functional unit configured to determine the waveform monitor brightness Y on the basis of the entire screen APL and the partial region APL that are the characteristic values of the input image signal ID, which is output from the input unit 101, and the upper-limit display luminance P. In the present embodiment, the brightness determining unit 206 detects the entire screen APL and the partial region APL. Further, the brightness determining unit 206 obtains, from the display luminance obtaining unit 107, the upper-limit display luminance P that is set by the user. Then, the brightness determining unit 206 determines the waveform monitor brightness Y on the basis of the entire screen APL, the partial region APL, and the upper-limit display luminance P. The method of determining the waveform monitor brightness Y is described later. The brightness determining unit 206 outputs the waveform monitor brightness Y and the input image signal ID to the OSD image generating unit 105. In the present embodiment, the partial region including the region on which the waveform monitor is superimposed is a waveform-monitor including region of regions obtained by evenly dividing the screen into four (for example, lower left region). As long as the region in which the waveform monitor is displayed is included, the method of obtaining the partial region is not particularly limited.

<Processing Contents>

Next, the basic operation of the brightness determining unit 206 in the present embodiment is described with reference to FIG. 5.

Figure 5:
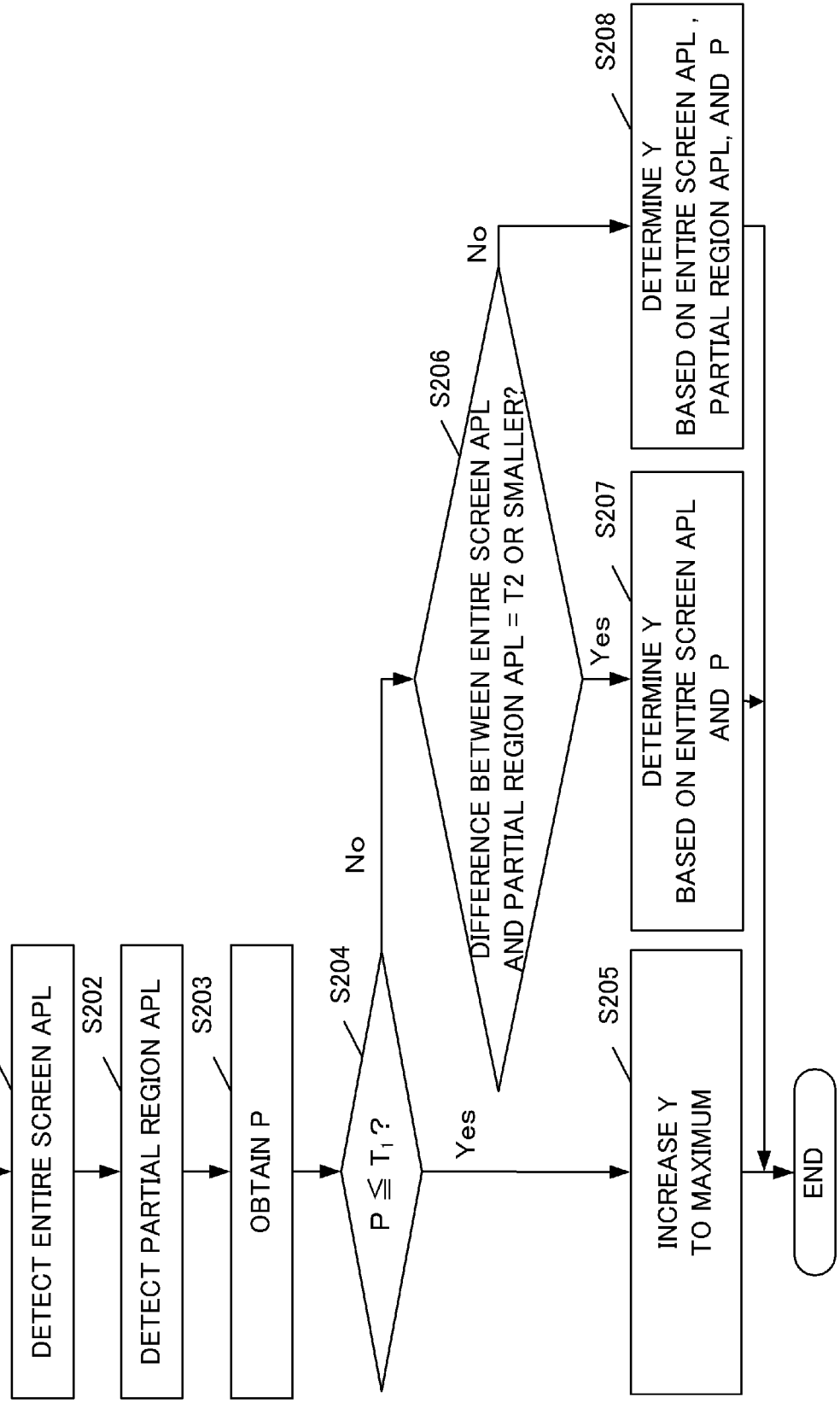
FIG. 5 is a flowchart illustrating an example of processing according to the second embodiment.

FIG. 5 is a flowchart illustrating the processing of determining the waveform monitor brightness Y according to the present embodiment.

The brightness determining unit 206 detects the APL (entire screen APL) of all the regions of the input image signal ID that is output from the input unit 101 (S201). Further, in the present embodiment, the brightness determining unit 206 detects the APL (partial region APL) of the above-mentioned partial region (S202). Then, the brightness determining unit 206 obtains the upper-limit display luminance P that is output from the display luminance obtaining unit 107 (S203), and determines whether or not the upper-limit display luminance P is the threshold $T_1$ or smaller (S204).

When the upper-limit display luminance P is the threshold $T_1$ or smaller (S204—Yes), the brightness determining unit 206 increases the waveform monitor brightness Y to maximum (S205). When the upper-limit display luminance P is larger than the threshold $T_1$ (S204—No), the brightness determining unit 206 determines whether or not a difference between the entire screen APL and the partial region APL is a predetermined threshold $T_2$ or smaller (S206).

Here, the threshold $T_2$ is set to a value so that when the above-mentioned difference is the threshold $T_2$ or smaller, the brightness of the waveform monitor is set to brightness that does not give glare to the user even when the waveform monitor brightness Y is determined on the basis of the entire screen APL as in the embodiment described above. The predetermined threshold $T_2$ can be 30, for example, but the threshold is not particularly limited. Further, the threshold may be variable. Further, the brightness determining unit 206 makes the determination on the basis of the above-mentioned difference in Step S206 of the present embodiment, but the processing in Step S208 may be performed irrespective of the above-mentioned difference.

When the difference between the entire screen APL and the partial region APL is the predetermined threshold $T_2$ or smaller (S206—Yes), the brightness determining unit 206 determines the waveform monitor brightness Y on the basis of the entire screen APL and the upper-limit display luminance P (S207). When the difference between the entire screen APL and the partial region APL is larger than the predetermined threshold $T_2$ (S206—No), the brightness determining unit 206 determines the waveform monitor brightness Y on the basis of the entire screen APL, the partial region APL, and the upper-limit display luminance P (S208), and outputs the resultant to the OSD image generating unit 105. The details of the processing of determining the brightness Y in Step S208 are described below.

<<Brightness Determining Processing (Step S208)>>

The processing in Step S208 in the present embodiment, that is, the processing that the brightness determining unit 206 performs to determine the waveform monitor brightness Y is described.

In the present embodiment, the brightness determining unit 206 determines the waveform monitor brightness Y by using the average value of the entire screen APL and the partial region APL. Specifically, the brightness determining unit 206 obtains a variable C that is a ratio between the $APL_{max}$ and an $APL_{avg}$ that is the average value of the entire screen APL and the partial region APL (Expression 6).

$$C = \frac{APL_{avg}}{APL_{max}} \qquad (6)$$

Then, the brightness determining unit 206 determines the waveform monitor brightness Y by using the variable A and the variable C (Expression 7).

$$Y = A + (100 - A) \times C \qquad (7)$$

(When Upper-Limit Display Luminance P is 400 cd/m²)

When the $APL_{max}$ is 255 and the upper-limit display luminance P is 400 cd/m², for example, the waveform monitor brightness Y is expressed by Expression (8) below.

$$Y = 25 + 75 \times \frac{APL_{avg}}{APL_{max}} \qquad (8)$$

Figure 6:
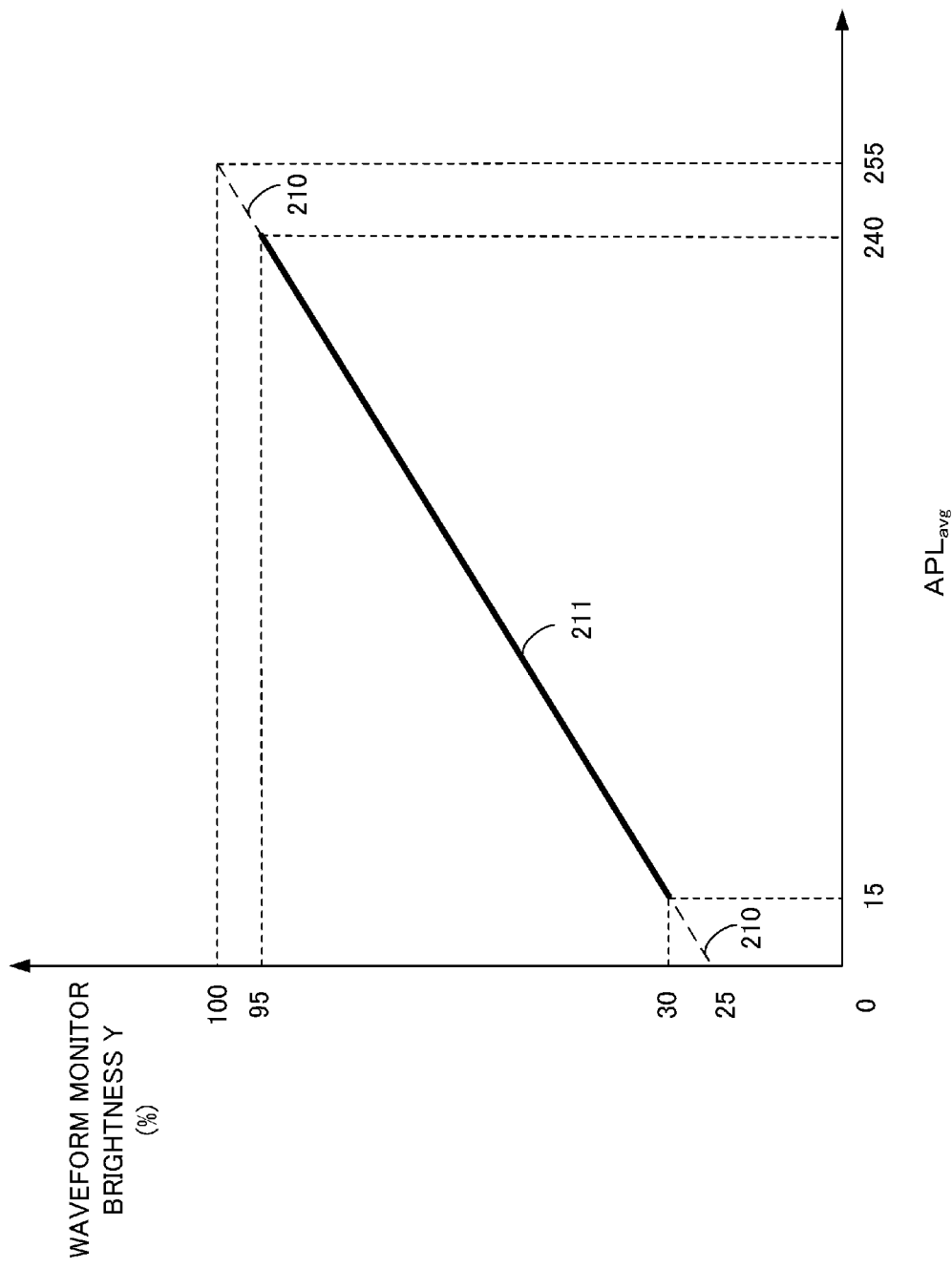
FIG. 6 is a diagram illustrating a relationship between the APL and the brightness of the waveform monitor according to the second embodiment.

FIG. 6 is a diagram illustrating the relationship between the $APL_{avg}$ and the waveform monitor brightness Y, which is expressed by Expression (8). As indicated by a thick line 211 in a FIG. 6, as the average value of the entire screen APL and the partial region APL becomes smaller, the waveform monitor brightness Y becomes lower. Here, in the present embodiment, the threshold $T_2$ is 30, and hence when the above-mentioned difference is 30 or smaller, the processing in Step S208 is not performed. Thus, in Step S208, the $APL_{avg}$ does not take values in the region indicated by a dashed line 210 ($APL_{avg} \leq 15$ or $240 \leq APL_{avg}$). In Step S208, brightness (30<Y<95) corresponding to the region indicated by the thick line 211 (15<$APL_{avg}$<240) is consequently determined as the waveform monitor brightness Y.

With this, when the entire screen APL is 100 and the partial region APL is 60, the waveform monitor brightness Y obtained through the processing in the first embodiment is about 55% from Expression (4), but in the present embodiment, the waveform monitor brightness Y is about 48% from Expression (8). This means that glare that is given when the waveform monitor is displayed while an image with the high entire screen APL (the image is bright as a whole) and the low partial region APL (the partial region is dark) is displayed can be reduced more effectively. In addition, the waveform monitor is displayed more brightly as the above-mentioned average value becomes higher so that the display image and the waveform monitor are prevented from being largely different from each other in brightness, and hence the user can see the waveforms without difficulty.

In Step S208, the brightness determining unit 206 determines the waveform monitor brightness Y on the basis of the $APL_{avg}$ and the upper-limit display luminance P, but may determine the waveform monitor brightness Y by using the partial region APL instead of the $APL_{avg}$. Further, the brightness determining unit 206 may determine the waveform monitor brightness Y by using a smaller one of the entire screen APL and the partial region APL instead of the $APL_{avg}$. In addition, the brightness determining unit 206 may determine the waveform monitor brightness Y by using, instead of the $APL_{avg}$, a value that is the weighted average of the entire screen APL and the partial region APL.

<Advantageous Effect of Present Embodiment>

As described above, the display apparatus according to the present embodiment reduces the liquid crystal brightness of the waveform monitor more as the average value of the entire screen APL and the partial region APL becomes smaller when the upper-limit display luminance is higher than the above-mentioned threshold and the difference between the entire screen APL and the partial region APL is larger than the above-mentioned threshold. In addition, the display apparatus according to the present embodiment increases the reduction amount of the brightness of the waveform monitor as the upper-limit display luminance becomes higher, thereby being capable of reducing glare more appropriately.

Third Embodiment

Now, a third embodiment of the present invention is described.

In the embodiments described above, there is described the example in which the brightness of the points (the points representing the signal levels) that are plotted on the basis of the waveform monitor to be displayed is controlled. Some display apparatuses, however, cannot change only the brightness of the above-mentioned points, and changes the brightness of the base together with the brightness of the points. In such a case, semitransparent processing is performed on the entire waveform monitor including the base and the waveforms to control the brightness of the entire waveform monitor. When the waveform monitor after the semitransparent processing is superimposed on the input image to be displayed, however, the image of the back portion of the waveform monitor of the input image signal ID is displayed as a dark image, and hence the image of the back portion of the waveform monitor is difficult to see.

In view of this, in the present embodiment, the brightness of the entire waveform monitor is controlled on the basis of the APL (hereinafter referred to as "back region APL") of a back region that is a waveform-monitor displaying region of the input image signal ID in addition to the entire screen APL and the upper-limit display luminance P. With this, the image of the back portion of the waveform monitor is prevented from being difficult to see. Now, configurations and processing different from those in the first embodiment are described in detail. Configurations and processing similar to those in the first embodiment are denoted by the same reference symbols and description thereof is omitted.

<Overall Configuration>

Figure 7:
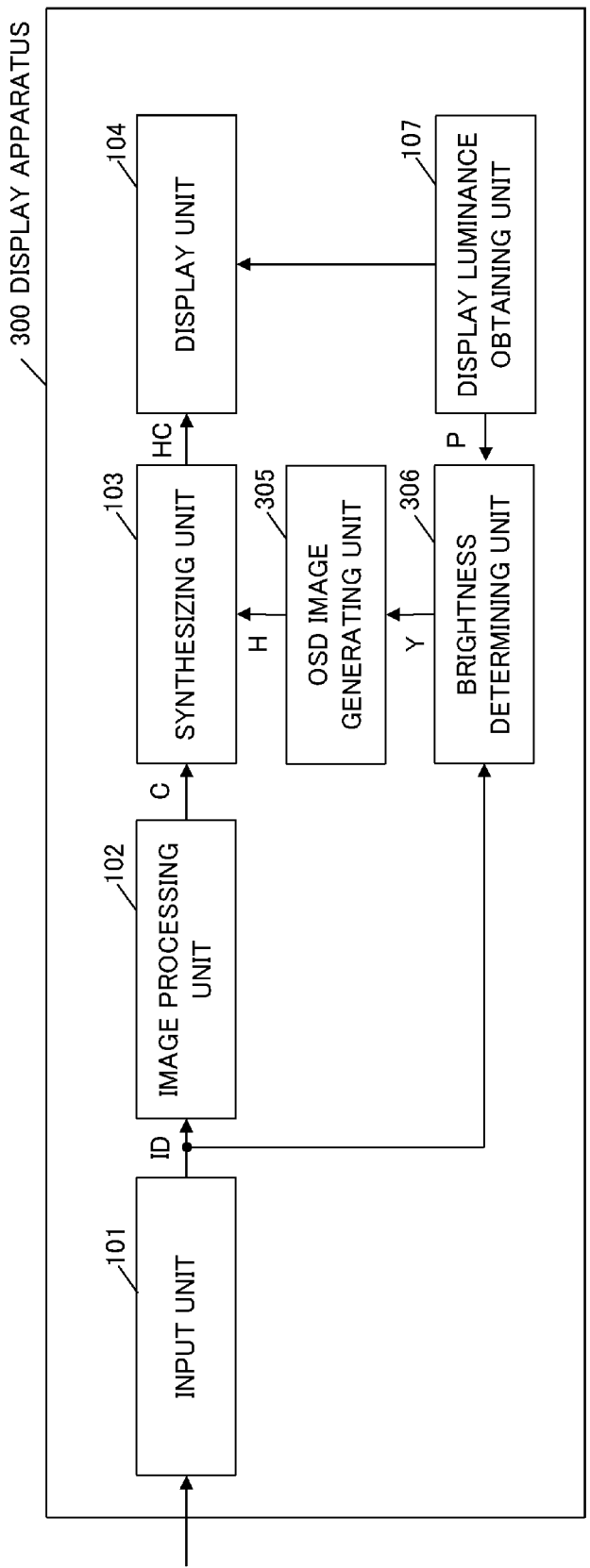
FIG. 7 is a functional block diagram illustrating an example of a display apparatus according to a third embodiment.

FIG. 7 is a functional block diagram illustrating an example of a display apparatus 300 according to the present embodiment. The display apparatus 300 includes an OSD image generating unit 305 and a brightness determining unit 306 instead of the OSD image generating unit 105 and the brightness determining unit 106 of the first embodiment.

The brightness determining unit 306 is a functional unit configured to determine the waveform monitor brightness Y on the basis of the entire screen APL and the back region APL that are the characteristic values of the input image signal ID, which is output from the input unit 101, and the upper-limit display luminance P. In the present embodiment, the brightness determining unit 306 detects the entire screen APL and the APL (back region APL) of the back portion of the waveform monitor. Further, the brightness determining unit 306 obtains, from the display luminance obtaining unit 107, the upper-limit display luminance P that is set by the user. Then, the brightness determining unit 306 determines the waveform monitor brightness Y on the basis of the entire screen APL, the back region APL, and the upper-limit display luminance P. In the present embodiment, the brightness determining unit 306 determines the brightness of the entire waveform monitor including the base and the waveforms. The method of determining the waveform monitor brightness Y is described later. The brightness of the image in the base is lower than that of the above-mentioned points (for example, half the brightness of that of the points). The brightness determining unit 306 outputs the waveform monitor brightness Y and the input image signal ID to the OSD image generating unit 305. In the description of the present embodiment, it is assumed that a position on the screen at which the waveform monitor is displayed is determined in advance.

The OSD image generating unit 305 is a functional unit configured to generate the waveform monitor image signal H on the basis of the waveform monitor brightness Y and the input image signal ID. The waveform monitor brightness Y is output from the brightness determining unit 306. In the present embodiment, the OSD image generating unit 305 generates the waveform monitor image signal H subjected to the semitransparent processing. Further, the OSD image generating unit 305 outputs the generated waveform monitor image signal H to the synthesizing unit 103.

<Processing Contents>

Figure 8:
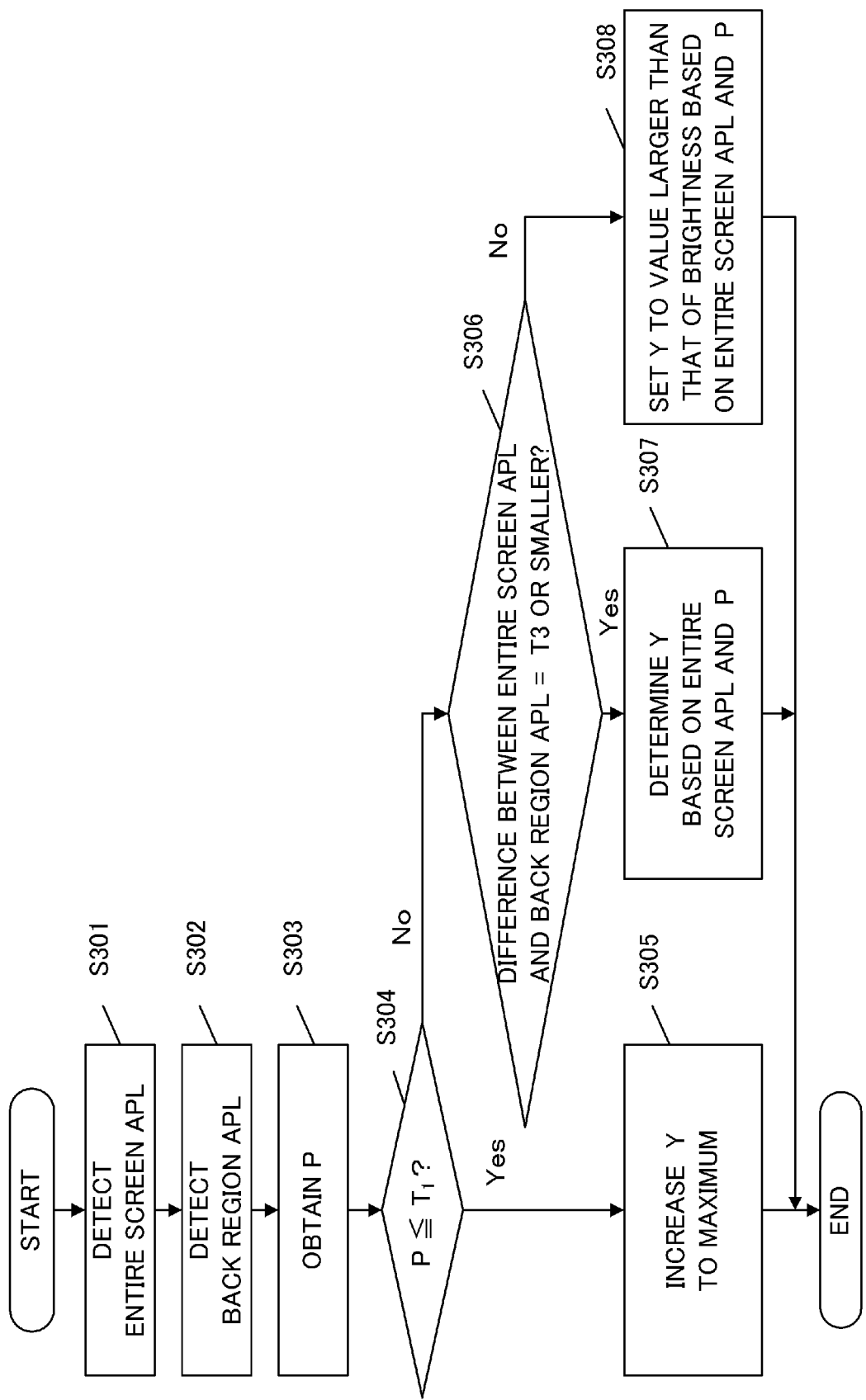
FIG. 8 is a flowchart illustrating an example of processing according to the third embodiment.

Next, the basic operation of the brightness determining unit 306 in the present embodiment is described with reference to FIG. 8. FIG. 8 is a flowchart illustrating the processing of determining the waveform monitor brightness Y according to the present embodiment.

The brightness determining unit 306 detects the APL (entire screen APL) of all the regions of the input image signal ID that is output from the input unit 101 (S301). Further, in the present embodiment, the brightness determining unit 306 detects the above-mentioned back region APL (S302). Then, the brightness determining unit 306 obtains the upper-limit display luminance P that is output from the display luminance obtaining unit 107 (S303), and determines whether or not the upper-limit display luminance P is the threshold $T_1$ or smaller (S304).

When the upper-limit display luminance P is the threshold $T_1$ or smaller (S304—Yes), the brightness determining unit 306 increases the waveform monitor brightness Y to maximum (S305). When the upper-limit display luminance P is larger than the threshold $T_1$ (S304—No), the brightness determining unit 306 determines whether or not a difference between the entire screen APL and the back region APL is a predetermined threshold $T_3$ or smaller (S306).

Here, the threshold $T_3$ is set to a value so that when the above-mentioned difference is the threshold $T_3$ or smaller, the waveform monitor subjected to the semitransparent processing does not give the user feeling that the background region is dark even when the waveform monitor brightness Y is determined on the basis of the entire screen APL as in the embodiment described above. The predetermined threshold $T_3$ can be 30, for example, but the threshold is not particularly limited. Further, the threshold may be variable. Further, the brightness determining unit 306 makes the determination on the basis of the above-mentioned difference in Step S306 of the present embodiment, but the processing in Step S308 may be performed irrespective of the above-mentioned difference.

When the difference between the entire screen APL and the back region APL is the predetermined threshold $T_3$ or smaller (S306—Yes), the brightness determining unit 306 determines the waveform monitor brightness Y on the basis of the entire screen APL and the upper-limit display luminance P (S307). When the difference between the entire screen APL and the back region APL is larger than the predetermined threshold $T_3$ (S306—No), the brightness determining unit 306 sets the waveform monitor brightness Y to a value larger than that of the brightness based on the entire screen APL and the upper-limit display luminance P (S308), and outputs the resultant to the OSD image generating unit 305. The details of the processing of determining the brightness Y in Step S308 are described below.

<<Brightness Determining Processing (Step S308)>>

The processing in Step S308 in the present embodiment, that is, the processing that the brightness determining unit 306 performs to determine the waveform monitor brightness Y is described.

In the present embodiment, the brightness determining unit 306 multiplies the value of the variable A, which is used in the first embodiment, by 1.5, thereby determining the waveform monitor brightness Y. That is, the brightness determining unit 306 sets the waveform monitor brightness Y to a value that is at most 1.5 times as large as that in the first embodiment. Specifically, the brightness determining unit 306 uses the variable A and the variable B described above to determine the waveform monitor brightness Y with the use of Expression (9) below.

$$Y = 1.5 \times A + (100 - 1.5 \times A) \times B \quad (9)$$

In the present embodiment, the above-mentioned variable A (the waveform monitor brightness Y when the entire screen APL is zero) is set to the value that is 1.5 times as large as that in the first embodiment. The magnification is, however, not particularly limited and may be a value that is larger than one and achieves the effect of reducing brightness. Further, the above-mentioned magnification may be variable. Further, when the back region APL is larger than the entire screen APL, the ratio of the back region APL to the entire screen APL may be used as the above-mentioned magnification.

(When Upper-Limit Display Luminance P is 400 cd/m²)

When the $APL_{max}$ is 255 and the upper-limit display luminance P is 400 cd/m², for example, the waveform monitor brightness Y is expressed by Expression (10) below.

$$Y = 38 + 62 \times \frac{APL}{APL_{max}} \quad (10)$$

Figure 9:
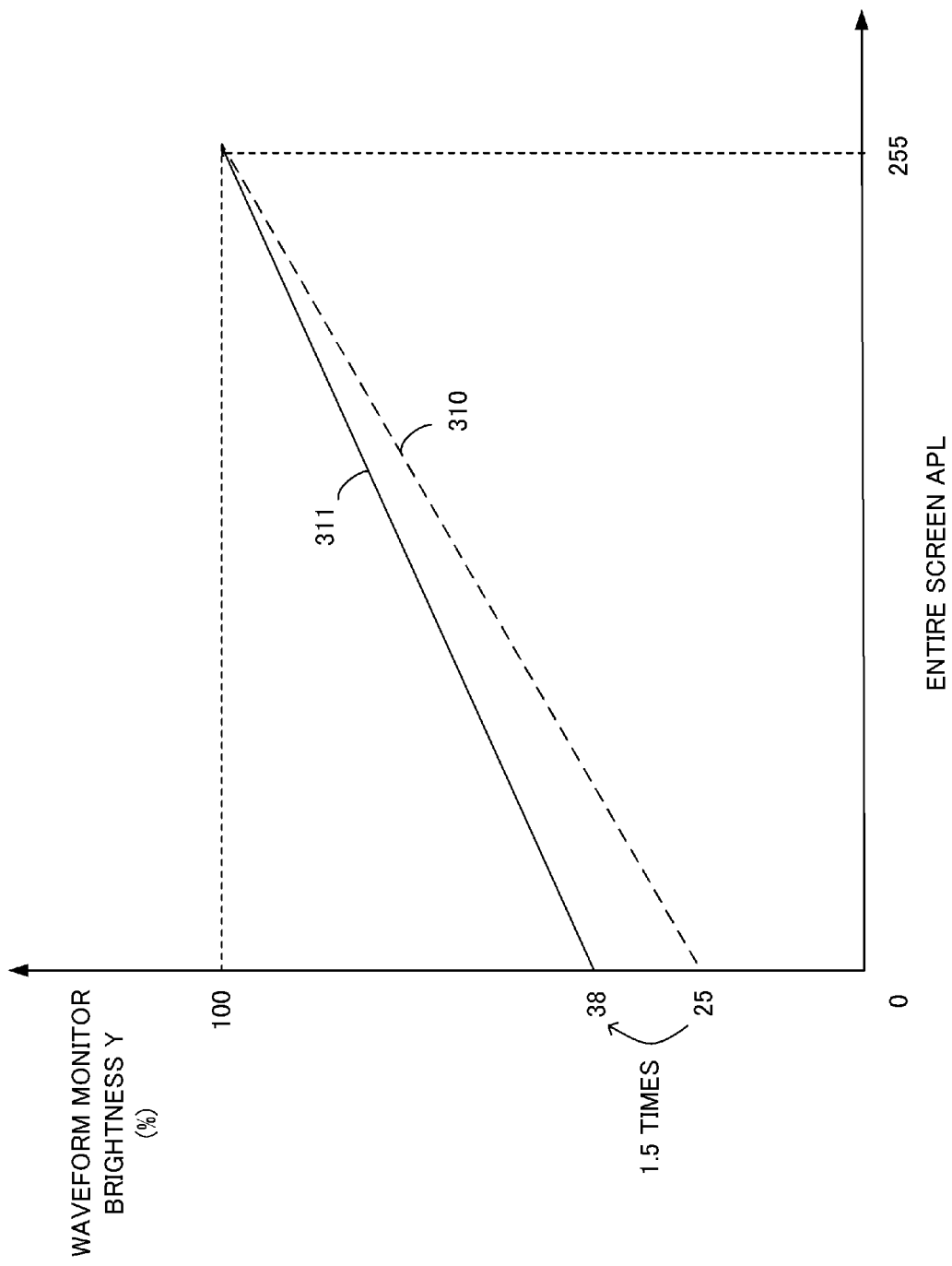
FIG. 9 is a diagram illustrating a relationship between the APL and the brightness of the waveform monitor according to the third embodiment.

FIG. 9 is a diagram illustrating the relationship between the APL and the waveform monitor brightness Y, which is expressed by Expression (10). As indicated by a solid line 311 in FIG. 9, the reduction amount of the brightness of the waveform monitor is reduced as compared to the first embodiment. With this, as compared to the first embodiment, the image of the back portion of the waveform monitor is prevented from being displayed as a dark image, and hence the image of the back portion of the waveform monitor can be prevented from being difficult to see. Further, the brightness of the waveform monitor is reduced to some extent so that glare is reduced.

<Advantageous Effect of Present Embodiment>

As described above, the display apparatus according to the present embodiment weakens, when the upper-limit display luminance is higher than the above-mentioned threshold and the difference between the entire screen APL and the back region APL is larger than the above-mentioned threshold, the effect of reducing the brightness of the waveform monitor for the low entire screen APL as compared to the processing in the first embodiment. With this, the image visibility of the back portion of the waveform monitor is ensured. Further, the display apparatus according to the present embodiment increases the reduction amount of the brightness of the waveform monitor for the low entire screen APL as the upper-limit display luminance becomes higher, thereby being capable of reducing glare that is given when the waveform monitor is displayed while a dark image is being displayed with the luminance set to high.

Fourth Embodiment

Now, a fourth embodiment of the present invention is described.

In the first embodiment described above, there is described the example in which the waveform monitor brightness Y is determined on the basis of the entire screen APL and the upper-limit display luminance P. When the display apparatus performs backlight control, however, the display apparatus may perform the backlight control unintentionally because the display apparatus performs the backlight control on the basis of the display image including the waveform monitor and the input image.

As the backlight control method, for example, there is backlight control (hereinafter referred to as "power limit control") for limiting the maximum luminance on the basis of the APL of the display image (hereinafter referred to as "display image APL"), to thereby limit the power consumption (limit the maximum emission luminance to prevent the power consumption from reaching a predetermined threshold or larger). Further, as the backlight control method, there is backlight control (hereinafter referred to as "global dimming control") for controlling the backlight emission amount of the entire screen on the basis of the display image APL.

In the power limit control, the display image APL is changed when the waveform monitor is displayed, and hence the luminance of the entire display image drops when the maximum emission luminance is reduced through limitation of the power consumption.

In the global dimming control, the display image APL is changed when the waveform monitor is displayed, and hence the display luminance of the entire display image is changed.

In view of this, in the present embodiment, there is described an example in which the brightness of the waveform monitor is controlled in consideration of the backlight control method that the display apparatus is performing so that effects that are generated through display of the waveform monitor to be imposed on the luminance of the entire display image are reduced.

Now, configurations and processing different from those in the first embodiment are described in detail. Configurations and processing similar to those in the first embodiment are denoted by the same reference symbols and description thereof is omitted.

<Overall Configuration>

Figure 10:
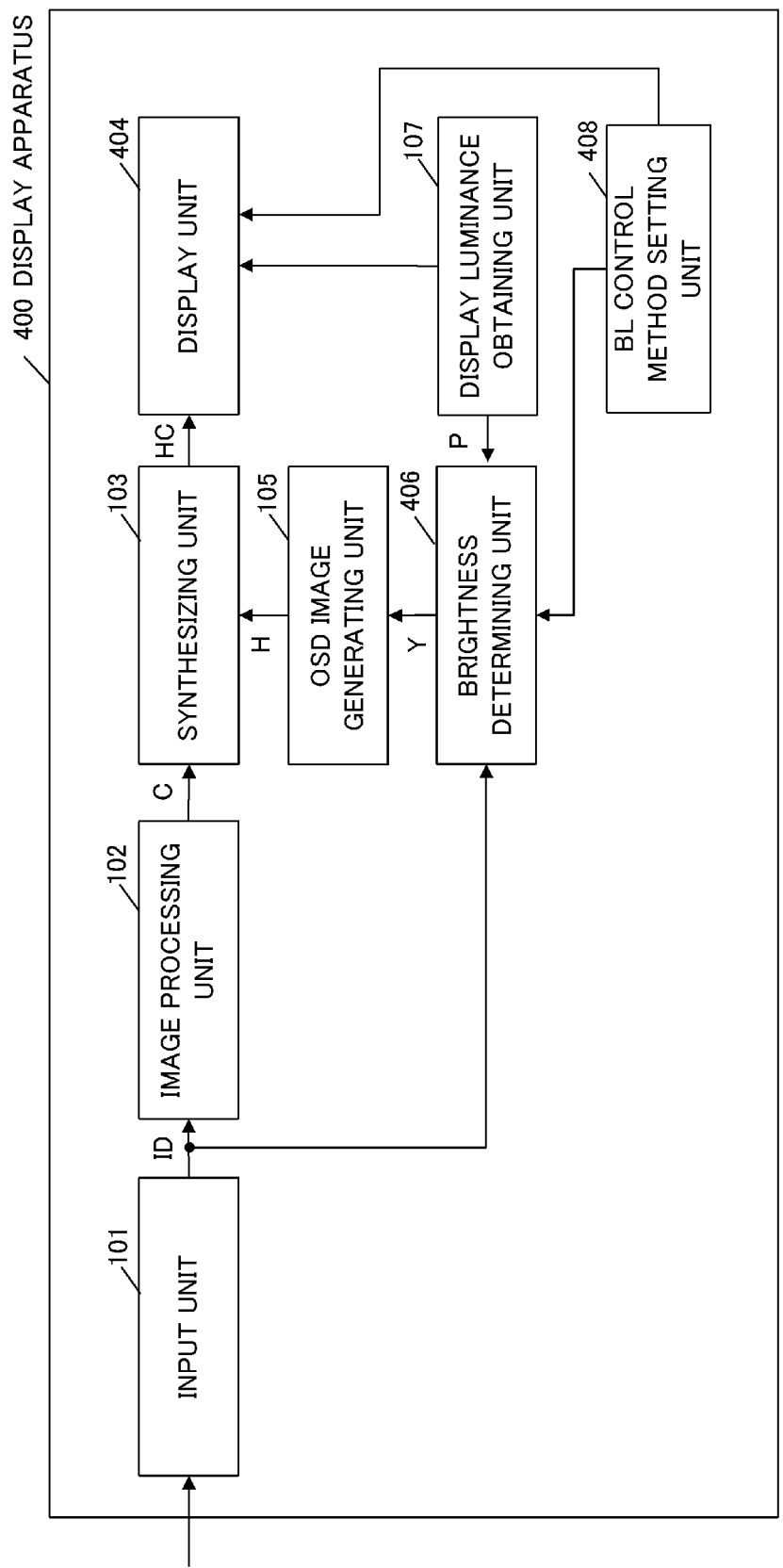
FIG. 10 is a functional block diagram illustrating an example of a display apparatus according to a fourth embodiment.

FIG. 10 is a functional block diagram illustrating an example of a display apparatus 400 according to the present embodiment. The display apparatus 400 includes a BL control method setting unit 408 and other components in addition to the configurations of the first embodiment. Further, the display apparatus 400 includes a display unit 404 and a brightness determining unit 406 instead of the display unit 104 and the brightness determining unit 106 of the first embodiment.

The display unit 404 includes the backlight and the liquid crystal panel, and is a functional unit configured to display the synthesized image HC that is output from the synthesizing unit 103. Further, the display luminance of the display unit 401 is controlled on the basis of the upper-limit display luminance P that is obtained by the display luminance obtaining unit 107. The upper-limit display luminance P is described later. The emission amount is controlled by the display luminance obtaining unit 107 and the BL control method setting unit 408.

The brightness determining unit 406 is a functional unit configured to determine the waveform monitor brightness Y on the basis of the APL that is the characteristic value of the input image signal ID, which is output from the input unit 101. In the present embodiment, the brightness determining unit 406 detects the entire screen APL. Further, the brightness determining unit 406 obtains, from the display luminance obtaining unit 107, the upper-limit display luminance P that is set by the user. In addition, the brightness determining unit 406 obtains the backlight control method from the BL control method setting unit 403. Then, the brightness determining unit 406 determines the waveform monitor brightness Y on the basis of the entire screen APL, the upper-limit display luminance P, and the backlight control method. The method of determining the waveform monitor brightness Y is described later. The brightness determining unit 406 outputs the waveform monitor brightness Y and the input image signal ID to the OSD image generating unit 105.

The BL control method setting unit 408 is a functional unit configured to obtain the backlight control method that is set by the user. In the present embodiment, the backlight control method is specified by the user from performing the power limit control, performing the global dimming control, and turning off <Processing Contents>

Next, the basic operation of the brightness determining unit 406 in the present embodiment is described with reference to FIG. 11.

Figure 11:
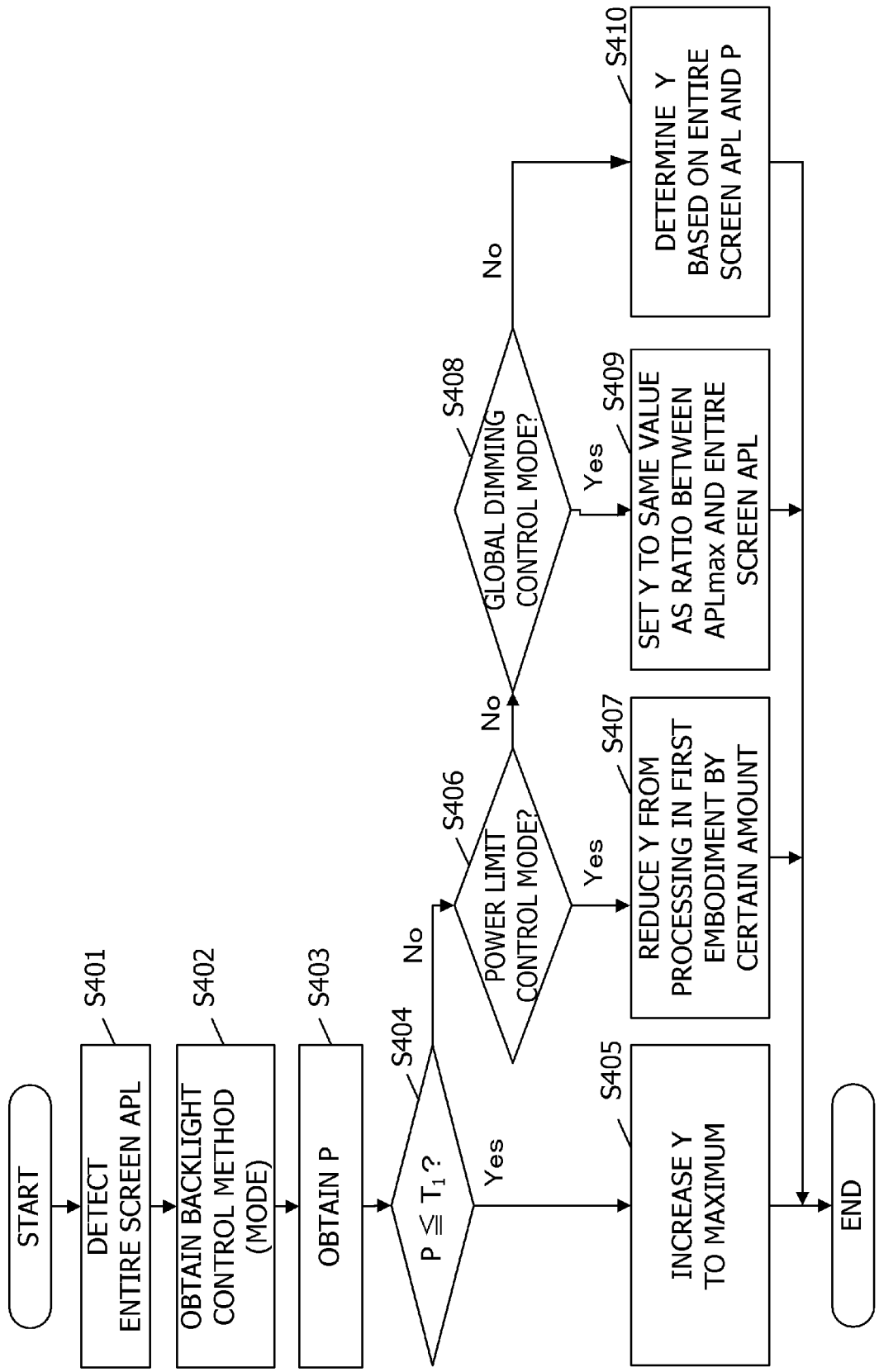
FIG. 11 is a flowchart illustrating an example of processing according to the fourth embodiment.

FIG. 11 is a flowchart illustrating the processing of determining the waveform monitor brightness Y according to the present embodiment.

The brightness determining unit 406 detects the APL (entire screen APL) of all the regions of the input image signal ID that is output from the input unit 101 (S401). Further, in the present embodiment, the brightness determining unit 406 obtains the backlight control method that is output from the BL control method setting unit 408 (S402). Then, the brightness determining unit 406 obtains the upper-limit display luminance P that is output from the display luminance obtaining unit 107 (S403), and determines whether or not the upper-limit display luminance P is the threshold $T_1$ or smaller (S404).

When the upper-limit display luminance P is the threshold $T_1$ or smaller (S404—Yes), the brightness determining unit 406 increases the waveform monitor brightness Y to maximum (S405). When the upper-limit display luminance P is larger than the threshold $T_1$ (S404—No), the brightness determining unit 406 determines whether or not the backlight control method is the power limit control mode (S406).

When the backlight control method is the power limit control mode (S406—Yes), the brightness determining unit 406 reduces the waveform monitor brightness Y to limit the maximum emission luminance, thereby preventing the power consumption from reaching the predetermined value or larger (S407). The details of the processing in Step S407 are described later. When the backlight control method is not the power limit control mode (S406—No), the brightness determining unit 406 determines whether or not the backlight control method is the global dimming control mode (S408).

When the backlight control method is the global dimming control mode (S408—Yes), the brightness determining unit 406 sets the waveform monitor brightness Y to the same value as a ratio between the $APL_{max}$ and the entire screen APL (S409). The details of the processing in Step S409 are described later. When the backlight control method is not the global dimming control mode (S408—No), the brightness determining unit 406 determines the waveform monitor brightness Y on the basis of the entire screen APL and the upper-limit display luminance P as in the first embodiment described above (S410). Then, the brightness determining unit 406 outputs the waveform monitor brightness Y to the OSD image generating unit 105.

<<Brightness Determining Processing (Step S407)>>

The processing in Step S407 in the present embodiment, that is, the processing that the brightness determining unit 406 performs to determine the waveform monitor brightness Y is described.

In Step S407 of the present embodiment, the brightness is reduced as compared to the first embodiment. First, the brightness determining unit 406 determines D that is a ratio (brightness per 1 cd/m²) between the upper-limit display luminance P and the maximum brightness (100%) (Expression 11).

$$D = \frac{100}{P} \tag{11}$$

Then, the brightness determining unit 406 uses the variable A and the variable B, which are described above, and the variable D to determine the waveform monitor brightness Y with the use of Expression (12) below.

$$Y = A + (100 - A) \times B - 50 \times D \tag{12}$$

As expressed by Expression (12), the brightness determining unit 406 reduces the waveform monitor brightness Y by 50 cd/m² as compared to the above-mentioned first embodiment. The reduction amount of the brightness is not particularly limited, and may be any value that achieves the power consumption of the predetermined value or smaller. Further, the reduction amount of the brightness may be variable.

(When Upper-Limit Display Luminance P is 400 cd/m²)

When the upper-limit display luminance P is 400 cd/m², for example, the waveform monitor brightness Y is expressed by Expression (13) below.

$$Y = 12 + 75 \times \frac{APL}{APL_{max}} \tag{13}$$

Figure 12:
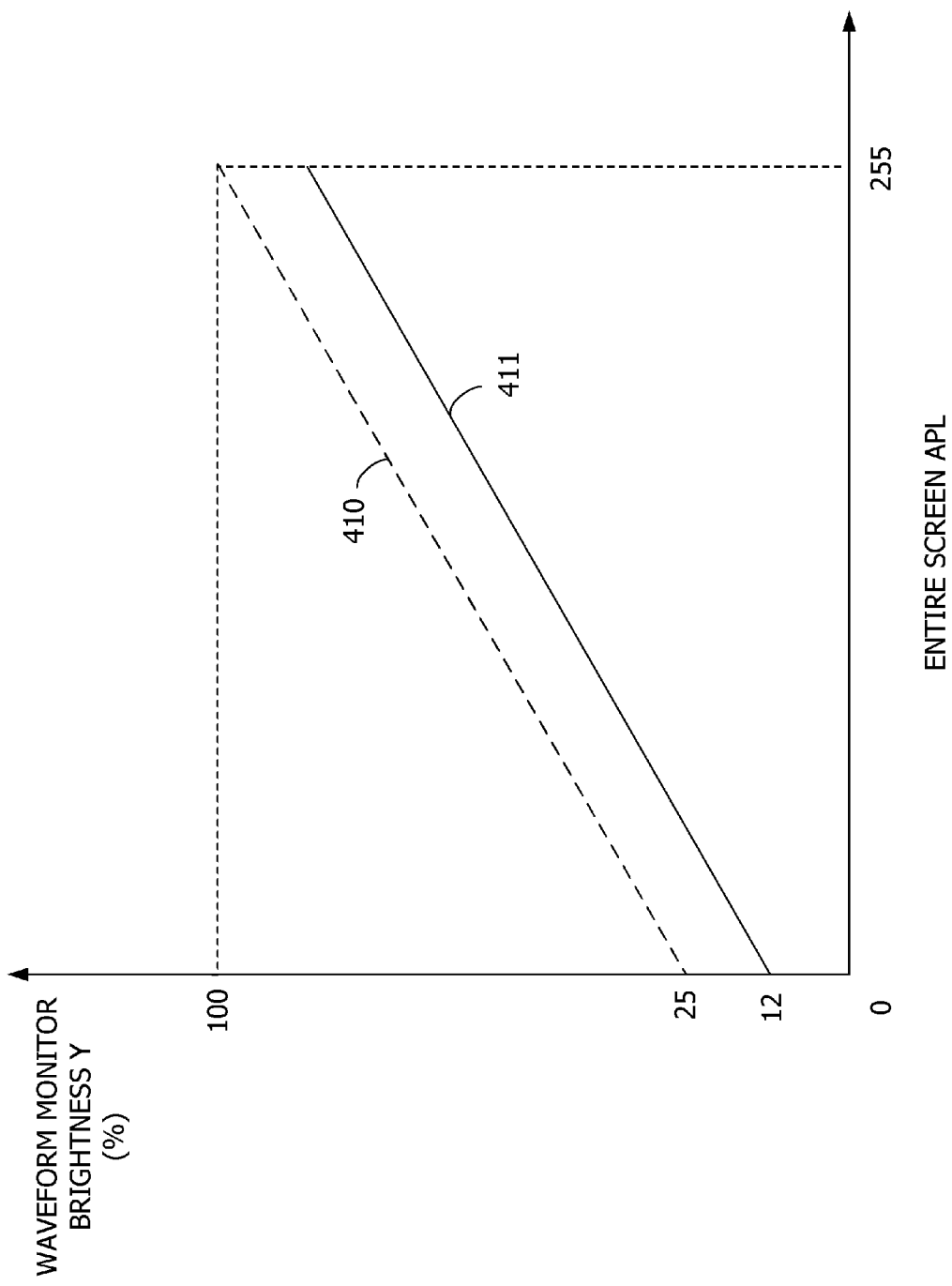
FIG. 12 is a diagram illustrating a relationship between the APL and the brightness of the waveform monitor according to the fourth embodiment.

FIG. 12 is a diagram illustrating the relationship between the APL and the waveform monitor brightness Y, which is expressed by Expression (13). As indicated by a solid line 411 in FIG. 12, as the APL becomes lower, the waveform monitor brightness Y becomes lower. In addition, as compared to the result in the first embodiment, which is indicated by a dashed line 410, the brightness is reduced in the present embodiment as indicated by the solid line 411. In the present embodiment, the waveform monitor brightness Y is reduced by 50 cd/m² as compared to the first embodiment, and hence when the upper-limit display luminance P is 400 cd/m², the waveform monitor brightness Y is set to a value smaller than that in the first embodiment by about 13. As described above, when the power limit control is being performed, the liquid crystal brightness of the waveform monitor is reduced as compared to the processing in the first embodiment so that the change in entire screen APL due to display of the waveform monitor is reduced, and the change in backlight luminance due to the effects of the power limit control is reduced.

<<Brightness Determining Processing (Step S409)>>

The processing in Step S409 in the present embodiment, that is, the processing that the brightness determining unit 406 performs to determine the waveform monitor brightness Y is described.

In Step S409 of the present embodiment, the waveform monitor brightness Y is set to the same value as the ratio between the $APL_{max}$ and the entire screen APL so that the change in display image APL before and after the waveform monitor is displayed is minimized. When the entire screen APL is smaller than a predetermined threshold $T_4$, however, the waveform monitor brightness Y is kept at a certain value so that the waveform monitor is bright to some extent. Specifically, the brightness determining unit 406 determines the waveform monitor brightness Y with the use of Expression (13) below.

$$Y = \begin{cases} 100 \times \dfrac{APL}{APL_{max}} & (APL \geq T_4) \\ 100 \times \dfrac{T_4}{APL_{max}} & (APL < T_4) \end{cases} \quad (14)$$

(When Upper-Limit Display Luminance P is 400 cd/m²)

Figure 13:
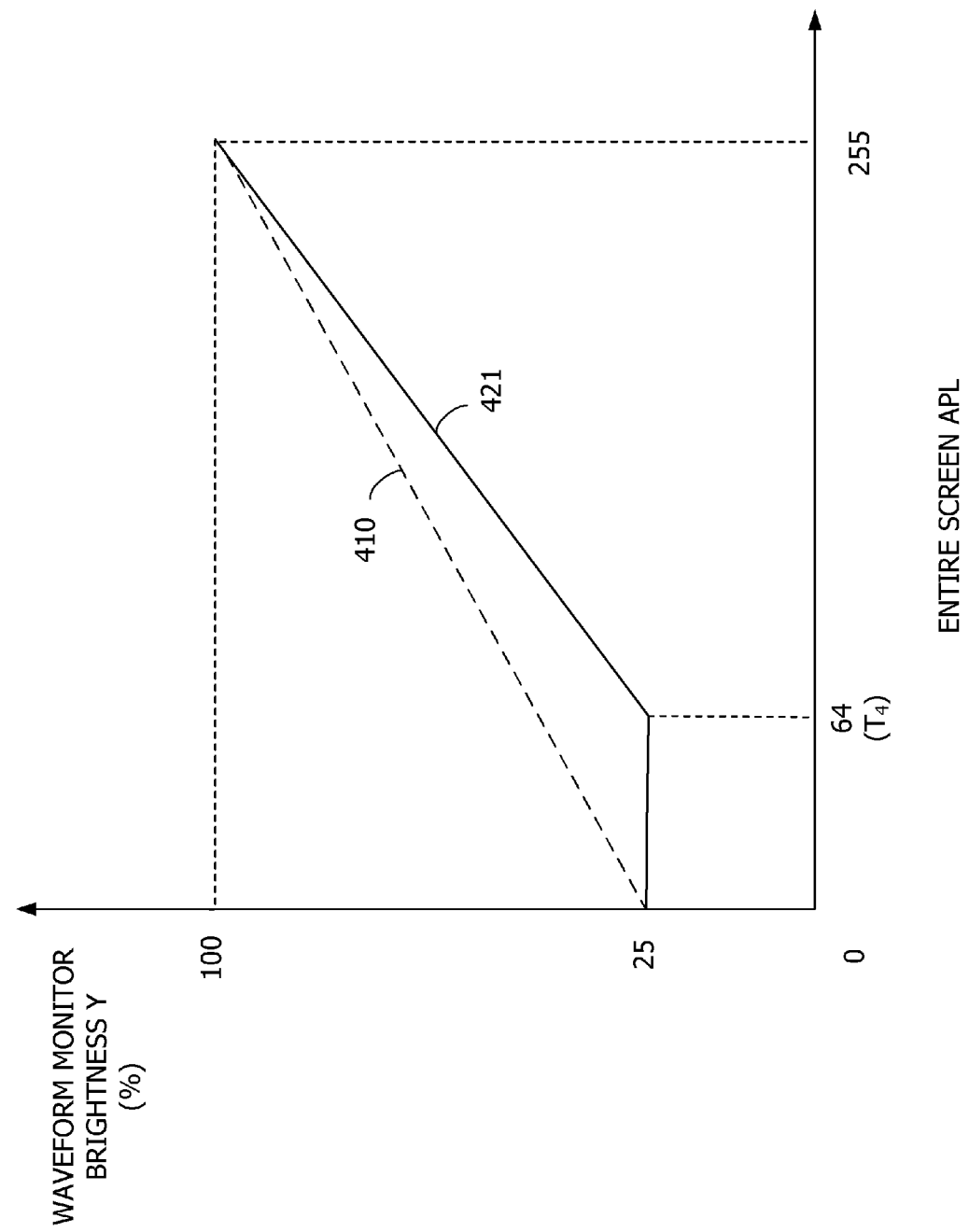
FIG. 13 is a diagram illustrating a relationship between the APL and the brightness of the waveform monitor according to the fourth embodiment.

When the upper-limit display luminance P is 400 cd/m², for example, as indicated by a solid line 421 in FIG. 13, the waveform monitor brightness Y is set to the same value as the ratio between the $APL_{max}$ and the entire screen APL when the entire screen APL is the threshold $T_4$ or larger. Thus, in the example of FIG. 13, the waveform monitor brightness Y is 25(%) when the entire screen APL is the threshold $T_4$ (for example, 64). Further, when the entire screen APL is smaller than the threshold $T_4$, the waveform monitor brightness Y is set to 25(%). As described above, when the global dimming control is being performed, the waveform monitor brightness Y is set to the same value as the ratio between the $APL_{max}$ and the entire screen APL. With this, the change in luminance of the entire backlight due to the waveform monitor is prevented, and the change in luminance of the display image is reduced.

Here, the threshold $T_4$ is set to a value so that when the above-mentioned difference is the threshold $T_4$ or smaller, the brightness of the waveform monitor is prevented from becoming too low through the global dimming control, and the brightness Y is kept at a certain value. The predetermined threshold $T_4$ can be 64, for example, but the threshold is not particularly limited. Further, the threshold may be variable.

<Advantageous Effect of Present Embodiment>

As described above, when the backlight control method is the power limit control, the brightness of the waveform monitor is reduced as compared to the processing result in the first embodiment so that the change in entire screen APL due to display of the waveform monitor can be reduced, and a reduction in display luminance other than that of the waveform monitor can be reduced. Further, when the backlight control method is the global dimming, the waveform monitor brightness Y is set to the same value as the ratio between the $APL_{max}$ and the entire screen APL so that the change in backlight luminance due to display of the waveform monitor can be reduced.

Modified Example of Present Embodiment

In the present embodiment, the control in Step S407 is performed when the backlight control method is set to the power limit control. In addition to the above-mentioned condition, however, whether or not the power limit control is actually being performed may be determined. Specifically, the processing in Step S407 described above may be performed when the backlight control method is the power limit control and the power limit control has been performed in a previous frame.

[Others]

In the embodiments described above, the brightness of the waveform monitor is changed linearly on the basis of the APL when the upper-limit display luminance is higher than the threshold, but the correspondence relationship between the APL and the waveform monitor is not particularly limited. The brightness of the waveform monitor may be changed on the basis of the APL in a stepwise manner, for example. Further, in the embodiments, the brightness of the waveform monitor is set to maximum when the APL is maximum. When the APL is the predetermined value or larger, however, the processing of clipping the brightness of the waveform monitor to maximum may be performed.

In the embodiments described above, there is described the example in which the above-mentioned processing is applied to the waveform monitor, but the above-mentioned processing may be applied to graphics images (OSD images) that are superimposed on input images to be displayed, other than the waveform monitor.

In the embodiments described above, there is described the example in which the display control apparatus is provided inside the display apparatus, but the above-mentioned processing may be performed only by a display control apparatus that is a separate component from the display apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-049555, filed on Mar. 16, 2018, which is hereby incorporated by reference herein in its entirety.

What is claimed is:

1. A display apparatus configured to display an input image and a graphics image on a display unit, wherein the graphics image is displayed together with the input image, the display apparatus comprising:
at least one processor that operates as:
an obtaining unit configured to receive a setting value relating to display luminance of the display apparatus; and
a control unit configured to display the graphics image on the display unit with a luminance gradation;
wherein the control unit is further configured to
i) reduce the luminance gradation of the graphics image more as an average picture level (APL) of the input image becomes smaller, and
ii) reduce the luminance gradation of the graphics image more as the setting value becomes larger.

2. The display apparatus according to claim 1, wherein the setting value is a value relating to maximum display luminance of the display apparatus.

3. The display apparatus according to claim 1, wherein the input image is a high dynamic range (HDR) image.

4. The display apparatus according to claim 1, wherein the at least one processor further operates as:
a detection unit configured to detect the APL of the input image.

5. The display apparatus according to claim 4, wherein detection unit is further configured to detect the APL relating to all regions of the input image.

6. The display apparatus according to claim 4, wherein
the detection unit is further configured to detect a first APL relating to all regions of the input image, and a second APL relating to a partial region of the input image, wherein the partial region includes a region on which the graphics image is superimposed, and
the control unit is further configured to determine the luminance gradation of the graphics image on the basis of (1) the setting value, (2) the first APL, and (3) the second APL, in a case where a difference between the first APL and the second APL is larger than a predetermined value.

7. The display apparatus according to claim 6, wherein the control unit is further configured to reduce the luminance gradation of the graphics image more as an average value of the first APL and the second APL becomes smaller.

8. The display apparatus according to claim 4, wherein
the detection unit is further configured to detect a first APL relating to all regions of the input image, and a third APL relating to a region of the input image on which the graphics image is superimposed, and
the control unit is further configured to increase the luminance gradation of the graphics image more in a case where a difference between the first APL and the third APL is larger than a predetermined value than a case where the difference is the predetermined value or smaller.

9. The display apparatus according to claim 1, wherein the at least one processor further operates as:
a backlight control unit configured to control emission luminance of a backlight in the display apparatus; and
a setting unit configured to receive an instruction indicating whether to allow the backlight control unit to perform control.

10. The display apparatus according to claim 9, wherein
the backlight control unit is further configured to limit, on the basis of the input image, maximum emission luminance to prevent power consumption from reaching a predetermined threshold or larger, and
the control unit is further configured to reduce the luminance gradation of the graphics image more in a case where the setting unit receives an instruction for performing backlight control than a case where the setting unit receives no instruction for performing the backlight control.

11. The display apparatus according to claim 9, wherein
the backlight control unit is further configured to limit the emission luminance of the backlight in the display apparatus on the basis of an image to be displayed on the display apparatus, and
the control unit is further configured to reduce the luminance gradation of the graphics image more in a case where the setting unit receives an instruction for performing backlight control than a case where the setting unit receives no instruction for performing the backlight control.

12. The display apparatus according to claim 1, wherein the graphics image is a waveform monitor having a horizontal axis corresponding to a horizontal axis of the input image and a vertical axis that takes a pixel gradation value, and on the vertical axis, a pixel gradation value of each pixel of the input image is plotted to be displayed.

13. A control method of a display apparatus configured to display an input image and a graphics image on a display unit, wherein the graphics image is displayed together with the input image, the control method comprising:
receiving a setting value relating to display luminance of the display apparatus; and
displaying the graphics image on the display unit with a luminance gradation,
wherein in the displaying,
i) the luminance gradation of the graphics image is reduced more as an average picture level (APL) of the input image becomes smaller, and
ii) the luminance gradation of the graphics image is reduced more as the setting value becomes larger.

14. A non-transitory computer readable medium that stores a program, wherein
the program causes a computer to execute a control method of a display apparatus configured to display an input image and a graphics image on a display unit, wherein the graphics image is displayed together with the input image, the control method includes:
   receiving a setting value relating to display luminance of the display apparatus; and
   displaying the graphics image on the display unit with a luminance gradation, and in the displaying,
i) the luminance gradation of the graphics image is reduced more as an average picture level (APL) of the input image becomes smaller, and
ii the luminance gradation of the graphics image is reduced more as the setting value becomes larger.

* * * * *